(12) United States Patent
Ito

(10) Patent No.: US 6,569,228 B2
(45) Date of Patent: May 27, 2003

(54) FUEL VAPOR TREATMENT SYSTEM

(75) Inventor: Masashi Ito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 102 days.

(21) Appl. No.: 09/838,275

(22) Filed: Apr. 20, 2001

(65) Prior Publication Data
US 2001/0052292 A1 Dec. 20, 2001

(30) Foreign Application Priority Data
Jun. 8, 2000 (JP) .................................. 2000-172585

(51) Int. Cl.[7] ............................................... B01D 53/02
(52) U.S. Cl. ..................... 96/134; 96/135; 96/140; 96/141; 96/142; 55/385.3; 123/519
(58) Field of Search ................... 123/518, 519, 123/520; 55/385.3; 95/45.9, 146; 96/108, 134, 4, 135, 140, 141, 142

(56) References Cited
U.S. PATENT DOCUMENTS
4,732,588 A * 3/1988 Covert et al.
5,861,050 A * 1/1999 Pittel et al.
5,957,113 A * 9/1999 Masaki et al.
2001/0052292 A1 * 12/2001 Ito

FOREIGN PATENT DOCUMENTS
JP 10-274106 10/1998
JP 11-93784 4/1999

* cited by examiner

Primary Examiner—Duane S. Smith
(74) Attorney, Agent, or Firm—Foley & Lardner

(57) ABSTRACT

A fuel vapor treatment system for an automotive vehicle on which an internal combustion engine is mounted. The fuel vapor treatment system includes a canister connected to a fuel tank and containing a fuel vapor adsorbing material which generates endothermic energy during desorption of fuel vapor. A membrane separation module is provided to be connected to the canister and including a separation membrane for separating a mixture gas purged from the canister into an air-rich component and a fuel vapor-rich component. Additionally, a condenser is provided to be connected to the membrane separation module to be supplied with the fuel vapor-rich component from the membrane separation module. The condenser is housed in the canister and adapted to cool and liquefy fuel vapor in the fuel vapor-rich component to obtain liquefied fuel by the endothermic energy generated in the canister, the liquefied fuel being recovered.

10 Claims, 9 Drawing Sheets

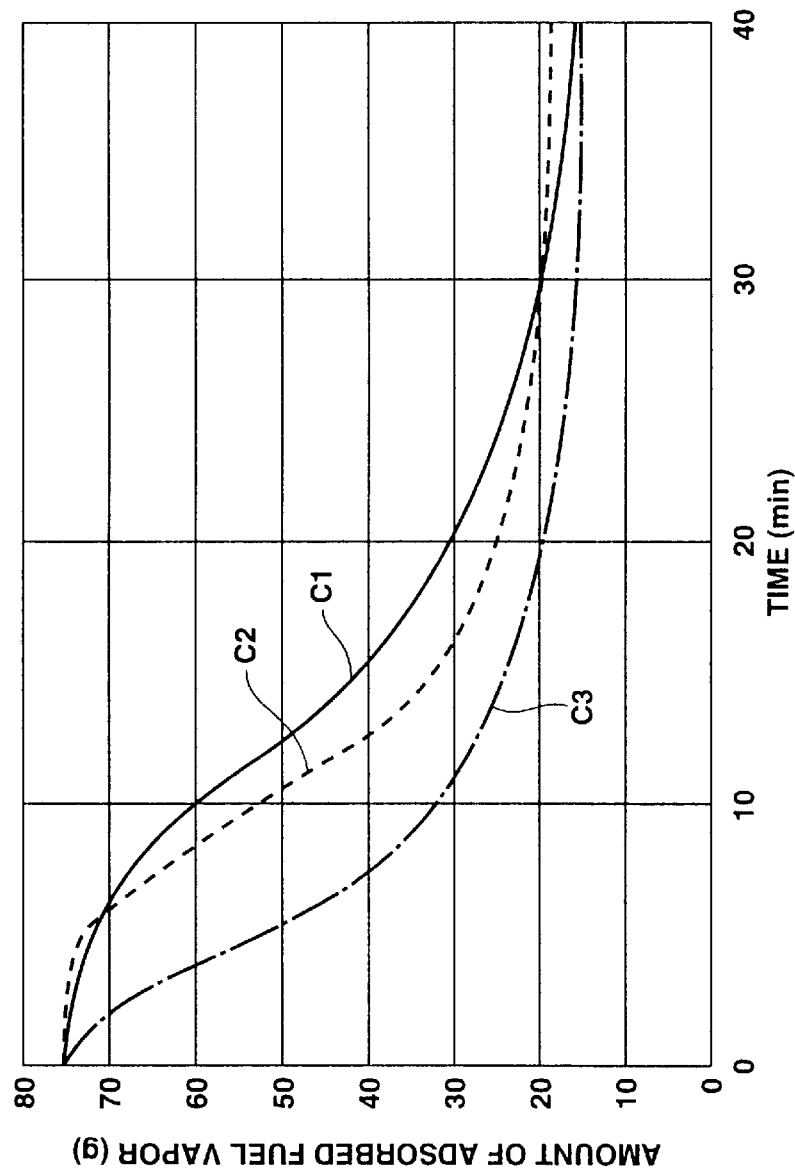

FUEL VAPOR TREATMENT SYSTEM

BACKGROUND OF THE INVENTION

This invention relates to improvements in a fuel vapor treatment system, and more particularly to the fuel vapor treatment system for separating and concentrating fuel vapor generated in a fuel tank of an internal combustion engine and then liquefying and recovering fuel.

Hitherto a variety of fuel vapor treatment systems have been put into practical use for the purpose of preventing emission of fuel vapor generated in a fuel tank of an automotive vehicle to atmospheric air. A typical one of the fuel vapor treatment systems is arranged as follows: Fuel vapor generated in the fuel tank upon temperature rise in the fuel tank is temporarily stored or adsorbed in activated carbon or the like in a canister via a line connecting the fuel tank and the canister. Fuel vapor stored in the activated carbon is introduced into an intake air passageway of the engine via a line provided with a vacuum control valve under the influence of intake vacuum in the intake air passageway in such a manner that the amount of adsorbed fuel vapor does not exceed the fuel adsorbing capacity of activated carbon.

In such a conventional fuel vapor treatment system, the amount of a mixture gas containing fuel vapor to be introduced into the intake air passageway is controlled by the vacuum control valve. However, the mixture gas contains fuel vapor and air which are not accurately metered, and therefore disturbs a set air-fuel ratio of air-fuel mixture to be supplied to the engine when the mixture gas is added to the air-fuel mixture at the upstream side of a fuel injector valve through which an accurately metered fuel is injected to be mixed with intake air. This makes it impossible to accomplish combustion at the set air-fuel ratio, thereby lowering drivability of engine while affecting components of exhaust gas emitted from the engine. Additionally, it has been required to lower fuel consumption in order to deal with recent environmental problems and promote resource-saving trends. Under such requirements, the above-discussed problems encountered in the conventional fuel vapor treatment system will be more apparent in case that combustion at ultra-lean air-fuel (air/fuel) ratio (approximately 40 to 50) of air-fuel mixture is carried out by direct fuel injection to a combustion chamber rather than conventional combustion at lean air-fuel ratio (approximately 20).

SUMMARY OF THE INVENTION

In order to solve such problems, it has been proposed in Japanese Patent Provisional Publications Nos. 10-274106 and 11-93784 to provide a membrane separation module which includes a separation membrane for separating the mixture gas (containing fuel vapor) from the canister into an air-rich component (gas) and a fuel vapor-rich component (gas). The fuel vapor-rich component discharged from the membrane separation module is fed to a condensing means for liquefying fuel vapor in the fuel vapor-rich component. The thus liquefied fuel vapor is recovered to the fuel tank.

However, in such a conventional fuel vapor treatment system provided with the membrane separation module, a semiconductor element using Peltier effect is employed as the condensing means. This not only makes the fuel vapor treatment system expensive but also increases electric energy consumption amount thereby increasing load to a battery.

It is an object of the present invention to provide an improved fuel vapor treatment system which can effectively overcome drawbacks encountered in conventional fuel vapor treatment systems.

Another object of the present invention is to provide an improved fuel vapor treatment system which can effectively liquefy and recover fuel vapor generated in a fuel tank, at a relatively low cost without using a conventional fuel vapor condensing means.

A further object of the present invention is to provide an improved fuel vapor treatment system including a membrane separation module, in which fuel vapor in a fuel vapor-rich component can be effectively cooled and liquefied under endothermic phenomena occurred in a fuel vapor adsorbing material during desorption of fuel vapor from the fuel vapor adsorbing material.

According to the present invention, a fuel vapor treatment system comprises a canister connected to a fuel tank and containing a fuel vapor adsorbing material which generates endothermic energy during desorption of fuel vapor. A membrane separation module is provided to be connected to the canister and including a separation membrane for separating a mixture gas purged from the canister into an air-rich component and a fuel vapor-rich component. Additionally, a condenser is provided to be connected to the membrane separation module to be supplied with the fuel vapor-rich component from the membrane separation module. The condenser is housed in the canister and adapted to cool and liquefy fuel vapor in the fuel vapor-rich component to obtain liquefied fuel by the endothermic energy generated in the canister, the liquefied fuel being recovered.

BRIEF DESCRIPTION OF THE DRAWINGS

In the drawings, like reference numerals designate like elements and parts throughout all figures, in which:

FIG. 9 is a graph showing variation in amount of fuel vapor adsorbed in a fuel vapor adsorbing material in a canister in terms of time lapsed, for the comparison purpose among the first, second and third embodiments.

DETAILED DESCRIPTION OF THE INVENTION

Figure 1:
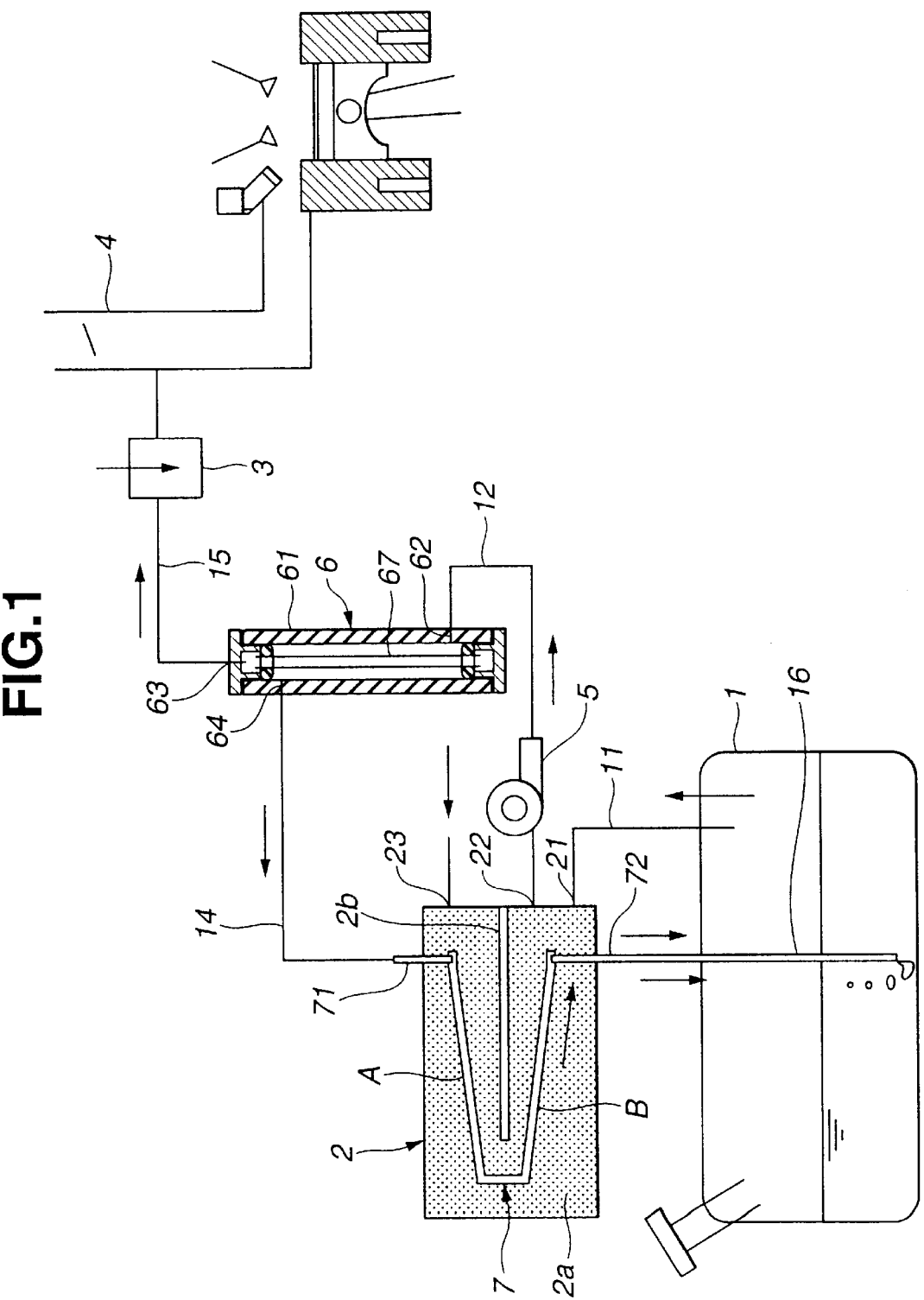
FIG. 1 is a schematic illustration, partly in section, of a first embodiment of a fuel vapor treatment system according to the present invention.

According to the present invention, a fuel vapor treatment system comprises a canister connected to a fuel tank and containing a fuel vapor adsorbing material which generates endothermic energy during desorption of fuel vapor. A membrane separation module is provided to be connected to the canister and including a separation membrane for separating a mixture gas purged from the canister into an air-rich component and a fuel vapor-rich component. Additionally, a condenser is provided to be connected to the membrane separation module to be supplied with the fuel vapor-rich component from the membrane separation module. The condenser is housed in the canister and adapted to cool and liquefy fuel vapor in the fuel vapor-rich component to obtain liquefied fuel by the endothermic energy generated in the canister, the liquefied fuel being recovered.

In the fuel vapor treatment system according to the present invention, fuel vapor generated in a fuel tank and lines or pipes connected to the fuel tank is once adsorbed in the fuel vapor adsorbing material in the canister. Subsequently, the adsorbed fuel vapor is desorbed or released from the fuel vapor adsorbing material by introducing air into the canister through a purge gas introduction port of the canister, thus accomplishing purging of fuel vapor from the canister. The desorbed fuel vapor is mixed with air in the canister to form a mixture gas. The mixture gas is discharged under the purging from the canister. The mixture gas is then flown into the membrane separation module so as to be separated into a fuel vapor-rich component (gas) and an air-rich component (gas), in which fuel vapor is concentrated. The fuel vapor-rich component is passed through the condenser so as to be cooled and liquefied and then recovered to the fuel tank through a lower opening of the condenser and a pipe connecting the condenser and the fuel tank. If the connecting pipe is extended to a position below the surface of liquid fuel in the fuel tank, remaining fuel vapor which has not been liquefied is discharged into liquid fuel in the fuel tank so that the fuel vapor can be adsorbed in the liquid fuel.

As discussed above, the mixture gas containing fuel vapor is separated into the fuel vapor-rich component and the air-rich component so that fuel vapor in the fuel vapor-rich component is concentrated, and therefore the liquefaction and recovery efficiency of fuel vapor can be largely improved. The fuel vapor-rich component or concentrated fuel vapor is fed into the condenser housed in the canister, in which the condensed fuel vapor is cooled and liquefied to be recovered to the fuel tank. The air-rich component is fed to an intake air passageway of an internal combustion engine.

The canister is mounted on an automotive vehicle and contains the fuel vapor adsorbing material which can adsorb fuel vapor generated in the fuel tank and the pipes connected to the fuel tank mainly during fuel supply and during parking of the vehicle, thereby suppressing emission of fuel vapor into atmospheric air. The canister houses therein the condenser, in which the condenser is cooled by endothermic energy generated in the canister during purging of fuel vapor from the canister (i.e., during desorption of fuel vapor from the fuel vapor adsorbing material). When purging of fuel vapor is started in the canister, the temperature of the fuel vapor adsorbing material is lowered under endothermic phenomena due to desorption of fuel vapor from the fuel vapor adsorbing material. When the temperature of the fuel vapor adsorbing material is lowered, cold is transmitted to the condenser thereby lowering the temperature of the condenser, so that fuel vapor flowing into the condenser can be cooled and liquefied. At this time, the fuel vapor has been concentrated or enriched by the membrane separation module and therefore tends to be readily liquefied.

In a conventional technique, a desorption treatment called "canister purging" has been carried in a fuel vapor treatment system including a canister containing a fuel vapor adsorbing material, during normal vehicle cruising, in order to prevent fuel vapor from being discharged into atmospheric air under breakthrough of fuel vapor in the canister. In this canister purging, the desorbed fuel vapor is fed as it is into an intake air passageway of the engine so as to be combusted in the engine.

However, with the fuel vapor treatment system according to the present invention, fuel vapor desorbed from the fuel vapor adsorbing material is fed into the engine after passing through the membrane separation module, so that fuel vapor treatment is accomplished without feeding the fuel vapor-rich component to the combustion chamber of the engine. This can prevent-disturbance in a lean burn engine operation and an engine operation under stratified charge combustion while improving the liquefaction and recovery efficiency of fuel vapor.

The separation membrane of the membrane separation module is of the air selectively permeable type wherein air is selectively permeable through the separation member, or of the fuel vapor selectively permeable type wherein fuel vapor is selectively permeable through the separation membrane. The separation membrane of the air selectively permeable type has a separation factor of not smaller than 4, preferably not smaller than 9. Similarly, the separation member of the fuel vapor selectively permeable type has a separation factor of not smaller than 4, preferably not smaller than 9. If the separation factor is smaller than 4, the liquefaction-recovery efficiency of fuel vapor cannot be improved. The separation factor means a ratio in rate or speed (at which air or fuel vapor permeates the separation membrane) between air and fuel vapor (air/fuel vapor) in case of the air selectively permeable type separation membrane, or between fuel vapor and air (fuel vapor/air) in case of the fuel vapor selectively permeable type separation membrane.

In case of using the separation membrane of the air selectively permeable type, vacuum generated in the engine is used as the driving force for the membrane separation, in which the vacuum is applied to the separation membrane so as to create pressure differential between the opposite sides of the separation membrane. This makes it unnecessary to mount a separate vacuum pump. Additionally, the air-rich component (gas) can permeate or penetrate the separation membrane of the air selectively permeable type whereas the fuel vapor-rich component (gas) cannot permeate the separation membrane. Consequently, the fuel vapor-rich component (gas) cannot be fed to the combustion chamber of the engine, which cannot affect the lean burn engine operation or the engine operation under stratified charge combustion, With the above-configured fuel vapor treatment system according to the present invention in which the condenser is disposed inside the canister, and therefore the condenser is effectively cooled by using endothermic phenomena generated when fuel vapor is desorbed from the fuel vapor adsorbing material in the canister, Accordingly, liquefaction and recovery of fuel vapor can be accomplished at a low cost and without increasing electric energy consumption amount. In other words, since fuel vapor concentrated by the membrane separation module is flown through the condenser to be liquefied, it becomes unnecessary to mount a separate liquefying device. Even in case that a separate semiconductor element (such as so-called Peltier element having Peltier effect) as the separate liquefying device, load to be applied to the separate liquefying device can be lightened.

By employing such a piping arrangement that fuel vapor generated in the fuel tank after engine starting is introduced via the condenser to the canister, a part of fuel vapor from the fuel tank is liquefied and returned to the fuel tank under the action of the condenser which has been cooled under endothermic phenomena occurred owing to desorption of fuel vapor in the canister. This prevents fuel vapor from the fuel tank from directly entering the canister, thereby hastening desorption of fuel vapor in the canister.

Next, concrete embodiments of the fuel vapor treatment systems according to the present invention will be discussed in detail.

Referring now to FIG. 1, an embodiment of a fuel vapor treatment system according to the present invention is illustrated comprising canister 2 for storing fuel vapor generated in fuel tank 1 and pipes or lines 11, 16 connected to the fuel tank. The canister has inflow port 21 connected to line 11 through which fuel vapor generated in fuel tank 1 is introduced into canister 2. Additionally, canister 2 has purge gas introduction port 23 through which a purge gas for purging fuel vapor adsorbed in fuel vapor adsorbing material 2a in the canister is introduced into canister 2. Further, canister 2 has outflow port 22 through which fuel vapor to be purged from canister 2 is discharged. In this embodiment, the fuel vapor adsorbing material is activated carbon.

Outflow port 22 of the canister is connected to gas introduction port 62 of membrane separation module 6 including separation membrane 67 for separating a gas (mixture gas) discharged from the canister into an air-rich component and a fuel-vapor rich component. The separation membrane of this embodiment is of the air selectively permeable type wherein air can be selectively permeate the separation membrane, so that air and fuel vapor are respectively put into the permeable and impermeable sides of the separation membrane. Blower 5 is disposed in line 12 connecting outflow port 22 of the canister and gas introduction port 62 of the membrane separation module.

Membrane separation module 6 has permeable side gas discharge port 63 and impermeable side gas discharge port 64. Impermeable side gas discharge port 63 is connected through line 14 to upper opening 71 of condenser 7. Condenser 7 has lower opening 72 which is connected through line or pipe 16 to the inside of fuel tank 1. The main body (located between the upper and lower openings) of condenser 7 is housed in canister 2, and, more specifically, embedded in fuel vapor adsorbing material 2a.

In this embodiment, fuel vapor generated in fuel tank 1 flows through line 11 into canister 2 and absorbed in fuel vapor adsorbing material 2a. Purge gas (air) is introduced through purge gas introduction port 23 so as to purge the absorbed fuel vapor from canister 2. At this time, the purged or released fuel vapor is in a state of being mixed with air thereby to form a mixture gas. The mixture gas is then introduced through line 12 into membrane separation module 6 under the action of blower 5. In membrane separation module 6, the mixture gas is separated-into an air-rich component and a fuel vapor-rich component under the action of air selectively permeable type separation membrane 67. The fuel vapor-rich component is introduced through the line 14 to the condenser in which fuel vapor in the fuel vapor-rich component is cooled and liquefied. The liquefied fuel is returned or recovered through the line 16 into the fuel tank 1.

Figure 2:
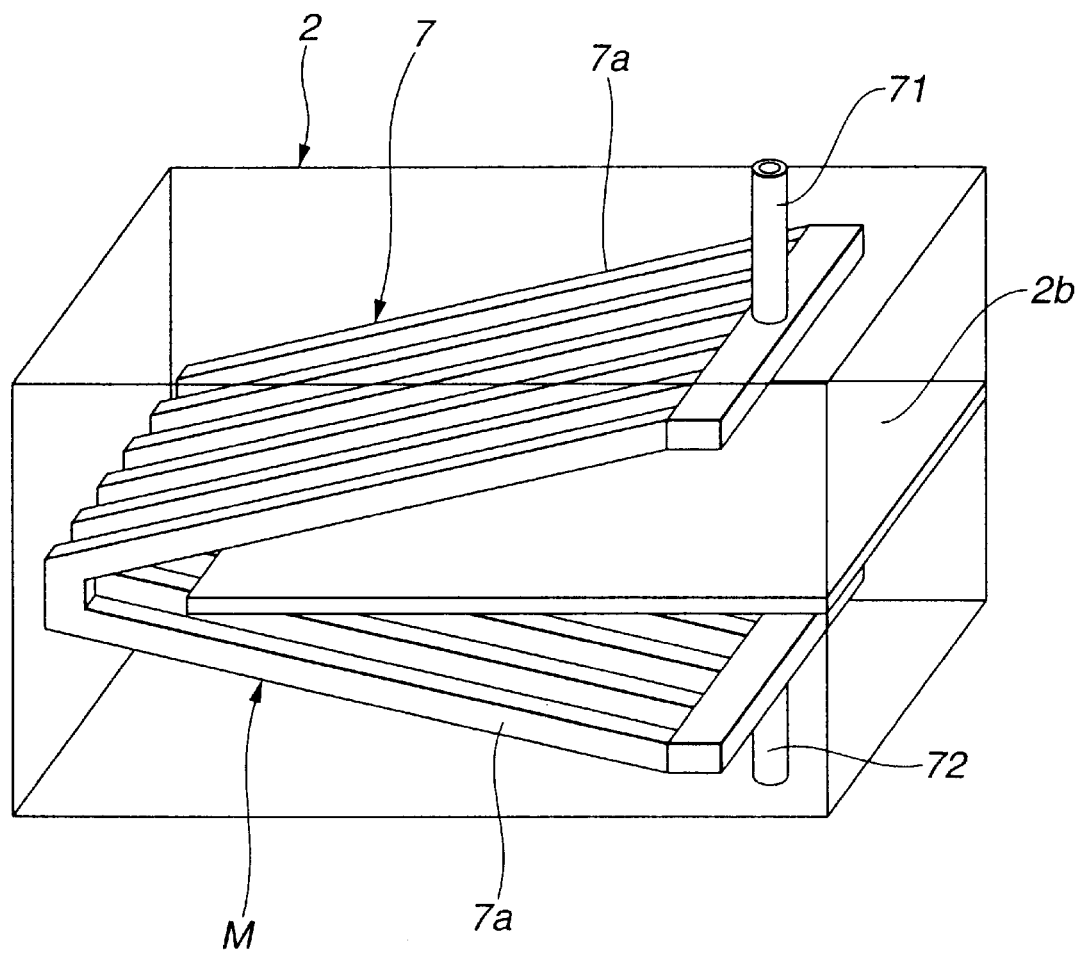
FIG. 2 is a schematic perspective view of a condenser used in the fuel vapor treatment system of FIG. 1 and in a state of being housed in a canister.
Figure 3:
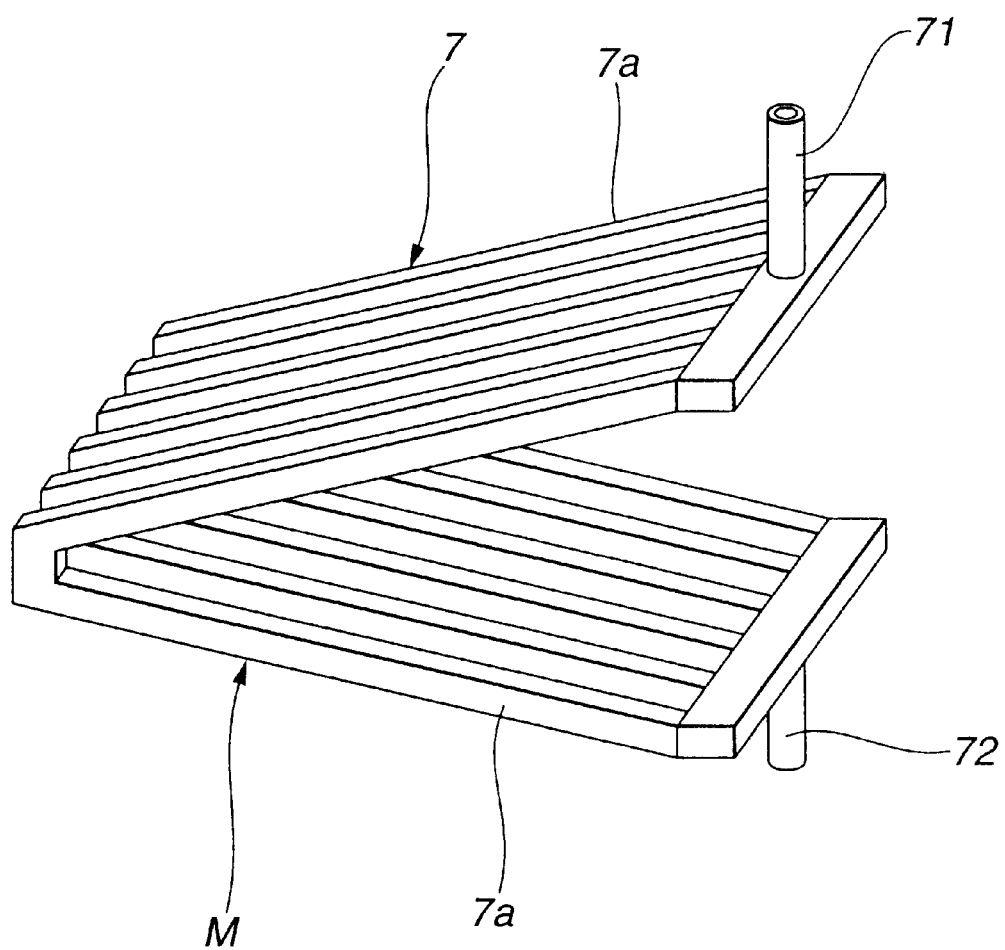
FIG. 3 is a schematic perspective view of the condenser itself shown in FIG. 2.

The condenser 7 will be discussed in detail with reference to FIGS. 2 and 3. The main body of the condenser 7 is housed in the canister 2 and has the upper and lower openings 71, 72. Lower opening 72 is connected to fuel tank 2. Condenser 7 has a generally C-shaped cross-section on an imaginary plane perpendicular to a partition wall 2b of the canister 2. The partition wall 2b extends from a right-side wall formed with the ports 21, 22, 23 and has an end edge (not identified) separate from a left-side side wall opposite to the right-side side wall. It will be understood that condenser 7 is generally C-shaped in cross-section in order to prevent interference with partition wall 2b and to increase the length of a flow passage for the fuel vapor-rich component. Additionally, condenser 7 is so shaped as to have a larger surface area in order to promote transmission of heat.

In this embodiment, the main body of condenser 7 includes a plurality of generally C-shaped pipes 7a each having a rectangular cross-section. The generally C-shaped pipes are parallelly arranged in a manner to be separate from each other, thereby forming a multiple pipe arrangement M. Each C-shaped pipe has an upper open end connected to upper opening 71, and lower open end connected to the lower opening 72. The condenser may have other structures which function such that fuel vapor in the fuel vapor-rich component is cooled and liquefied during flow in condenser 7 and that the liquefied fuel vapor is recovered to the fuel tank. Accordingly, the main body of condenser 7 may be constructed by vertically piling up a plurality of the multiple pipe arrangement M, in which the upper open end and the lower open end of each pipe 7a are respectively connected to upper opening 71 and lower opening 72. Additionally, the main body of condenser 7 may be provided with fins or the like if necessary, in order to improve a heat transmission efficiency.

Thus, the fuel vapor-rich component separated in membrane separation module 6 is introduced through upper opening 71 into the main body of condenser 7 and then discharged through lower opening 72. A part of fuel vapor in the fuel vapor-rich component is liquefied in condenser 7 and discharged together with gas which has not been liquefied, through lower opening 72.

Figure 4A:
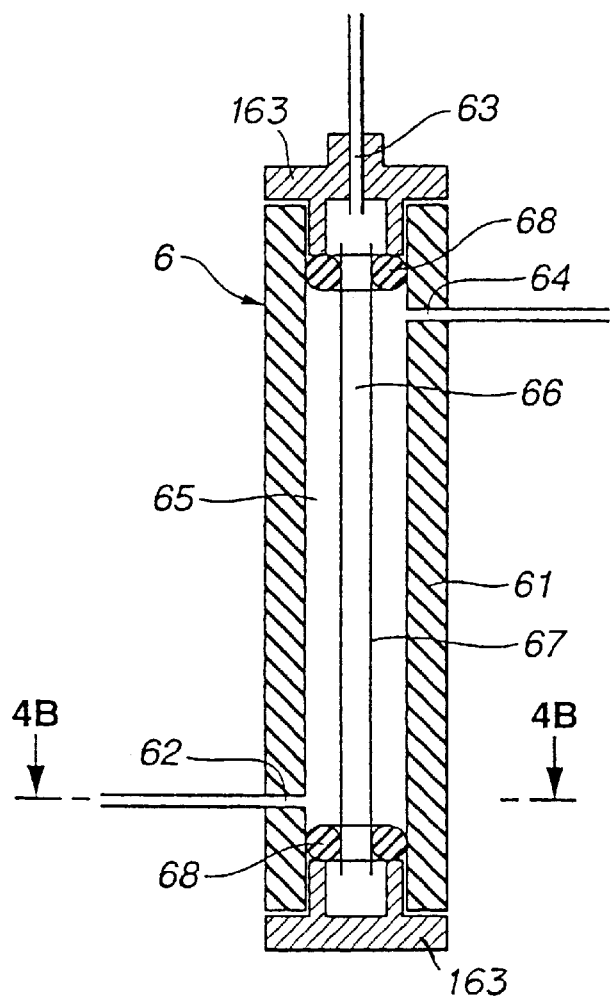
FIG. 4A is a schematic vertical section of a membrane separation module used in the fuel vapor treatment system of FIG. 1.
Figure 4B:
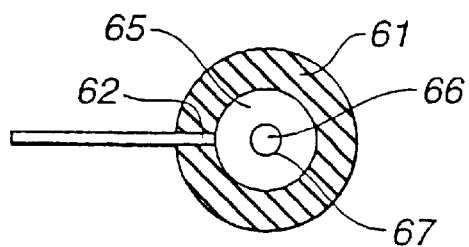
FIG. 4B is a schematic cross-section taken in the direction of arrows substantially along the line 4B—4B of FIG. 4A.

Membrane separation module 6 will be discussed in detail with reference to FIGS. 4A and 4B. Separation membrane 67 in this embodiment is pipe-shaped and includes a porous substrate pipe, and a separation membrane section coated on the substrate pipe. Separation membrane 67 is coaxially disposed inside cylindrical module casing 61 so as to form outside space 65 between them. Inside space 66 is formed inside separation membrane 67. As shown in FIG. 4A, O-rings 68 are disposed between cylindrical module casing 61 and cylindrical separation membrane 67 so as to maintain a gas-tight seal between the module casing and the separation membrane. The separation membrane is tightly fitted through O-rings between upper and lower lids 163 which face each other.

Gas introduction port 62 is communicated with outside space 65 while permeable side gas discharge port 63 is communicated with inside space 66 and connected to the intake air passageway 4 of the engine through line 15. Permeable side gas discharge port 63 is positioned in the upper lid and therefore at the upper-most part of the membrane separation module. Gas introduction port 62 is positioned at the lower part of the membrane separation module while impermeable side gas discharge port 64 is positioned at the upper part of the membrane separation module. Impermeable side gas discharge port 64 is connected through line 14 to upper opening 71 of condenser 7

In such a membrane separation module, a driving force for membrane separation can be applied to the separation membrane in such a manner as to allow gas to flow from outside space 65 to inside space 66, under the influence of intake vacuum generated by the engine and transmitted through line 15.

The separation membrane section of separation membrane 67 is formed of various materials (1) such as silica, alumina, zeolite, ZSM or aluminophosphate-based molecular sieves (such as ALPO, SAPO, TAPO and FAPO) or any combination of the above materials, or material (2) such as single membranes or compound hybrid flat membranes of carbonized membranes of pyrolytic polymeric plastic, mordenite membranes and ferrierite membranes. The separation membrane section may be formed of a combination of the materials (1) and the membranes (2). Concerning the shape of the separation membrane section, the separation membrane section of the separation membrane include flat membranes, spiral membranes, hollow fiber membranes and capillary membranes. An example of the hollow fiber membranes is polyimide hollow fiber membrane. While the separation membrane section of separation membrane 67 has been described as being formed of the above-discussed various materials, it will be understood that the whole body of separation membrane 67 may be formed of the above-discussed various materials.

With the separation membrane section formed of the above-discussed materials, the air-rich component is more permeable through the separation membrane section than the fuel vapor-rich component so that the air-rich component is selectively permeable, because nitrogen gas and oxygen gas contained in the air-rich component having molecular sizes smaller than those of fuel vapor in the fuel vapor-rich component. As a result, the air-rich component is discharged through permeable side gas discharge port 63 while the fuel vapor-rich component is discharged through impermeable side gas discharge port 64. During such membrane separation, intake vacuum generated at intake stroke of the engine can be used as the driving force for the membrane separation as discussed above. In this regard, vacuum control or change-over valve 3 is disposed in line 15 between permeable side gas discharge port 63 and intake air passageway 4 of the engine. This control valve 3 is adapted to be opened in timed relation to intake stroke of the engine only when the intake vacuum is lower than a certain value, thus controlling the membrane separation. It is preferable that the control valve controls a pressure differential between the permeable side and the impermeable side (the opposite sides of the separation membrane) in the membrane separation module to fall within a range of from 300 to 500 mmHg.

Manner of operation of the fuel vapor treatment system of the first embodiment will be discussed hereafter.

Fuel vapor is generated in the fuel tank mainly during parking and fuel supply of the vehicle and additionally even during engine stoppage of the vehicle. The thus generated fuel vapor is adsorbed in activated carbon 2a in canister 2 though line 11 in FIG. 1. The adsorbed fuel vapor can be treated by operating the fuel vapor treatment system upon starting the engine.

More specifically, when the engine is started, blower 5 serving as a gas carrying means is started so that air in atmospheric air is fed at a certain flow rate into the canister through purge gas introduction port 23. Desorption of the fuel vapor adsorbed by the activated carbon in the canister is started. The desorbed fuel vapor is purged through outflow port 22 from the canister, and then fed into membrane separation module 6 through gas introduction port 62 under the action of blower 5 so that gas from the canister is separated into the air-rich component and the fuel vapor-rich component which are located respectively at the permeable side and the impermeable side (i.e., the inside and outside of the separation membrane).

The air-rich component is discharged through permeable side gas discharge port 63 and supplied to intake air passageway 4 of the engine. The fuel vapor-rich component is discharged through impermeable side gas discharge port 64 and then introduced into the main body of condenser 2 housed in the canister, through upper opening 71 of the condenser. It will be understood that, immediately after starting of purging in the canister, cold cannot be sufficiently transmitted to condenser 7, and therefore liquefaction of fuel vapor in the fuel vapor-rich component (or concentrated fuel vapor) is not made so that the concentrated fuel vapor is discharged through lower opening 72 of canister 2 and fed to the fuel tank in which only a part of the condensed fuel vapor is adsorbed in liquid fuel in the fuel tank. After a while, cold generated under desorption of fuel vapor during purging of fuel vapor from the canister is transmitted to the condenser, and therefore the temperature within the condenser is lowered. As a result, liquefaction of the fuel vapor-rich component (the concentrated fuel vapor) begins to increase the recovery efficiency of fuel vapor into the fuel tank. Such an operational cycle is continuously repeated in which the fuel vapor adsorbed in canister 2 is gradually purged to gradually decrease the amount of fuel vapor in canister 2.

Figure 7:
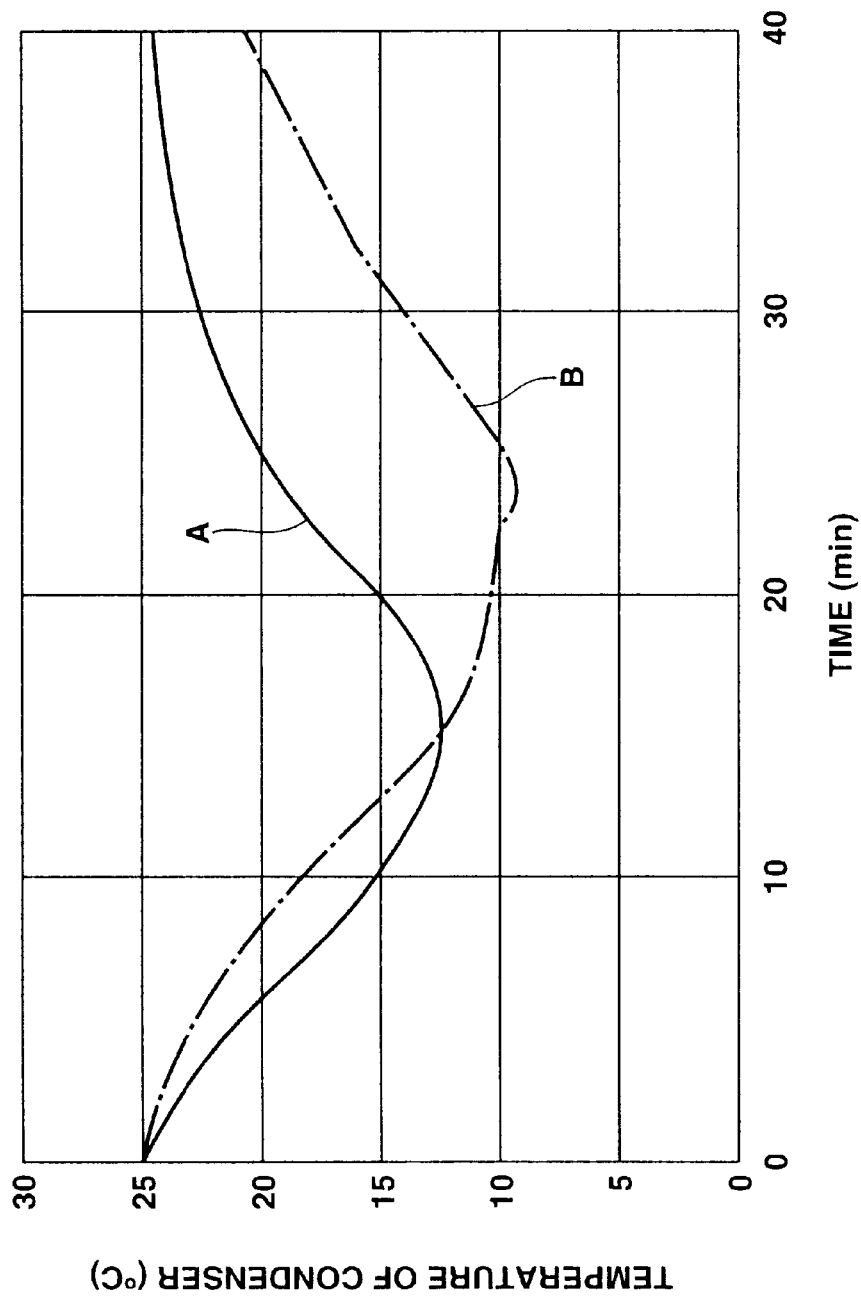
FIG. 7 is a graph showing variation in temperature of the condenser used in the fuel vapor treatment system of FIG. 1, in terms of time lapsed.
Figure 8:
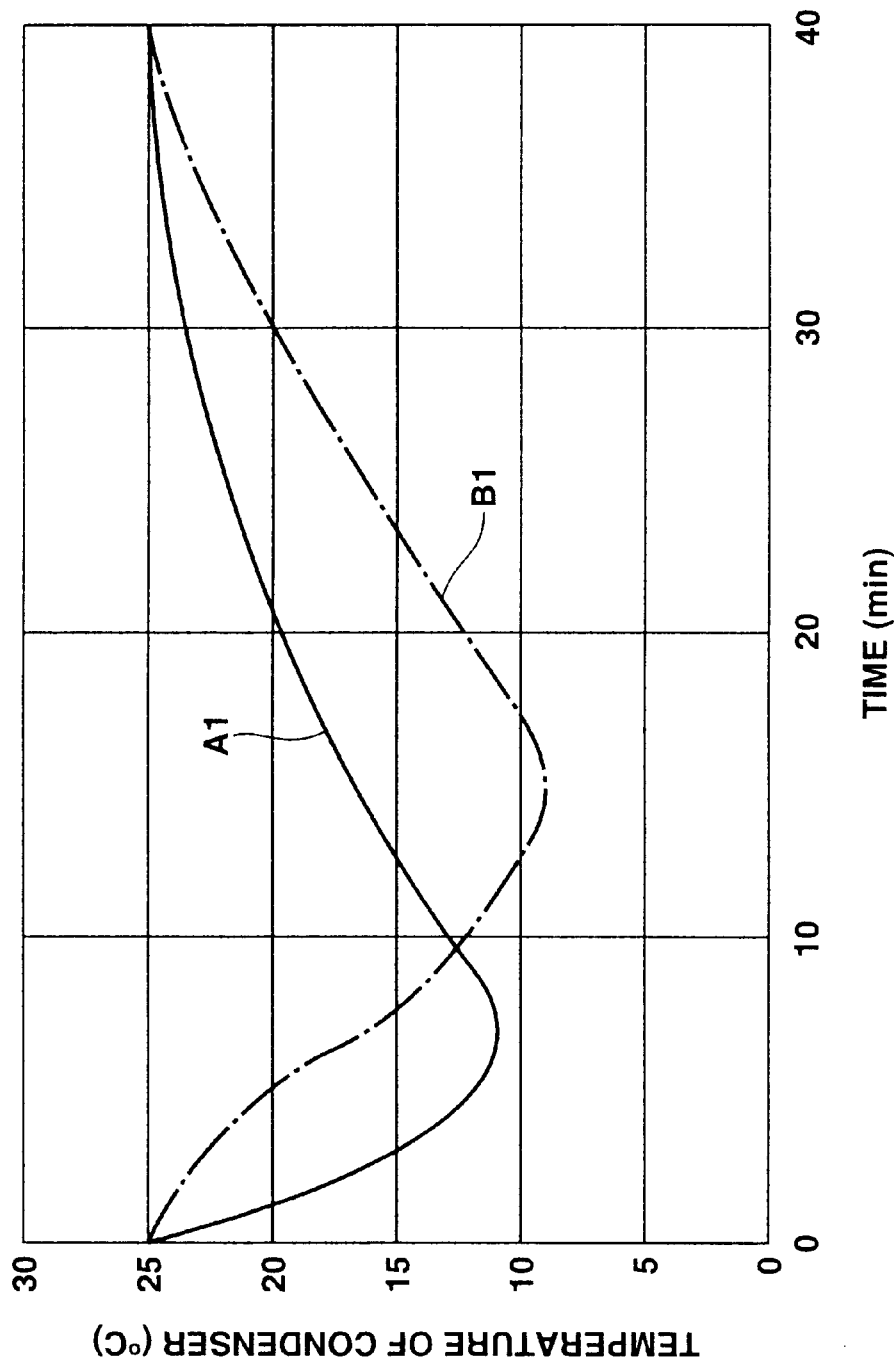
FIG. 8 is a graph showing variation in temperature of the condenser used in the fuel vapor treatment system of FIG. 6, in terms of time lapsed.

Experiments were conducted on the fuel vapor treatment system of the first embodiment in FIGS. 1 to 4, under test conditions in which the ambient temperature was 25° C.; the amount of the gas to be supplied to separation membrane 67 was 5 liters per minute; and the vacuum applied to the separation membrane was 400 mmHg. In the experiments, variation in temperature at sections A and B (indicated in FIG. 1) of condenser 7 was measured in terms of lapse of time, when desorption of gasoline vapor was started from a state in which 75 g of butane had been adsorbed in the fuel vapor adsorbing material in canister 2. The butane in the amount of 75 g corresponded to an amount of gasoline which would made saturation for the fuel vapor adsorbing material. Results of this measurement are shown in FIG. 8 in which a curve A indicates the temperature at the sections A while a curve B indicates the temperature at the section B. Additionally, in the experiments, variation in amount of the adsorbed fuel vapor within canister 2 was measured in terms of lapse of time corresponding to that in FIG. 7. Results of this measurement were indicated as a curve C1 in FIG. 9. The results in FIGS. 7 and 9 depict that the recovery efficiency of fuel vapor under liquefaction largely increases when the lapsed time exceeds 10 minutes in which the temperature of condenser 7 reaches the lowest level.

Figure 5:
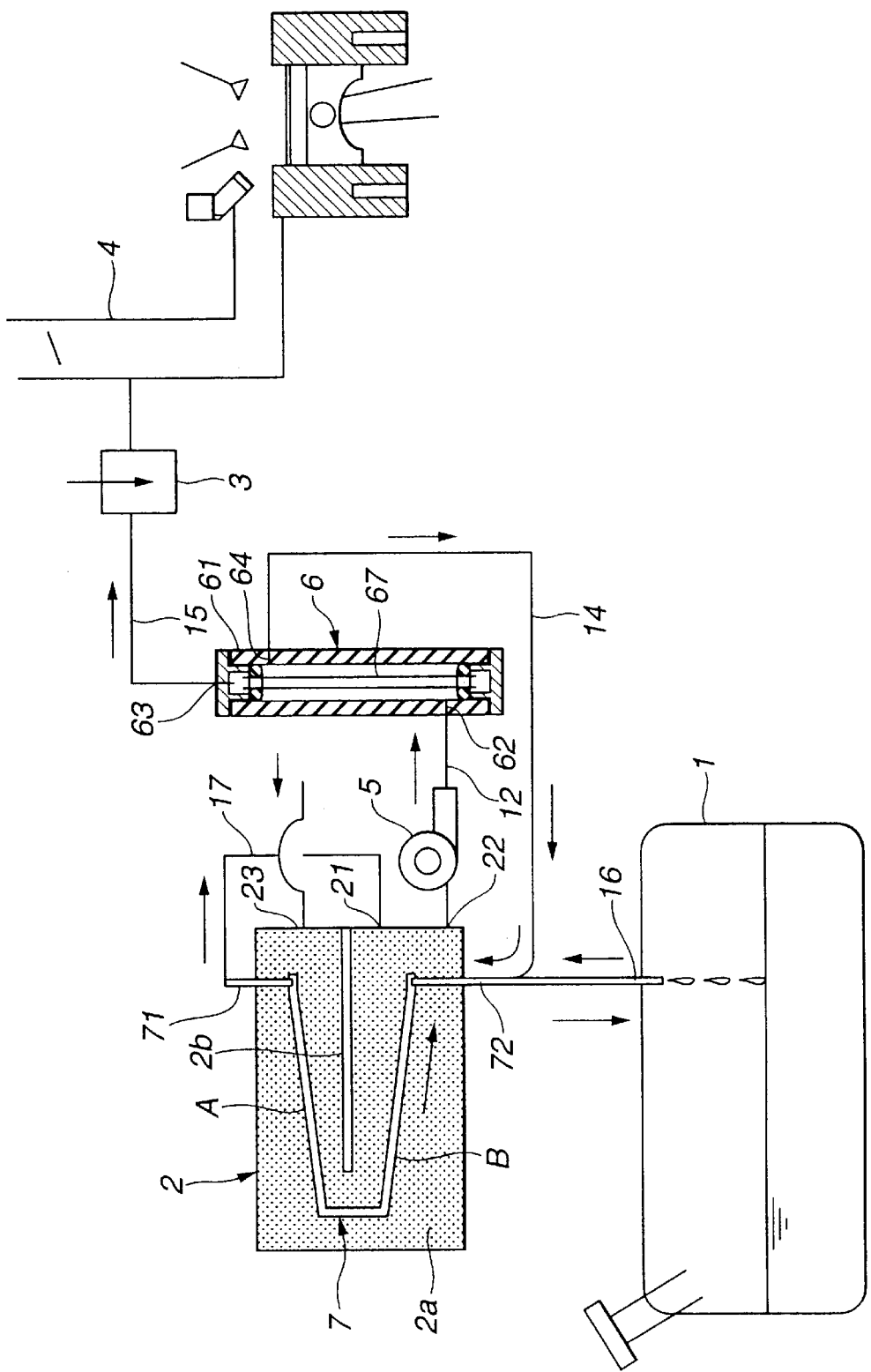
FIG. 5 is a schematic illustration, partly in section, of a second embodiment of the fuel vapor treatment system according to the present invention.

FIG. 5 illustrates a second embodiment of the fuel vapor treatment system according to the present invention, similar to the first embodiment shown in FIGS. 1 to 4. In this embodiment, impermeable side gas discharge port 64 of the membrane separation module is connected to lower opening 72 of the condenser. In addition, upper opening 71 of the condenser is connected to canister 2 in such a manner that the inside of the main body of the condenser is in communication with the inside of the canister, providing inflow port 21 through which fuel vapor flows into canister 2.

Fuel vapor generated in fuel tank 1 is introduced through line 16 into condenser 7 and liquefied since the fuel tank is connected only through line 16 to lower opening 72 of the canister. The liquefied fuel vapor returns through lower opening 72 of condenser 7 into line 16 to be recovered to the fuel tank. Fuel vapor which has not been liquefied is introduced through upper opening 71 of the condenser into canister 2.

Canister 2 has the fuel vapor inflow port 21 through which fuel vapor generated in fuel tank 1 is introduced into canister 2, purge gas introduction port 23 through which the purge gas is introduced into canister 2, and fuel vapor outflow port 22 through which fuel vapor to be purged from the canister is discharged. Additionally, blower 5 serving as the gas carrying means is disposed in line 12, similarly to that in the first embodiment.

Membrane separation module 6 has gas introduction port 62, permeable side gas discharge port 63 and impermeable side gas discharge port 64, similarly to that in the first embodiment. Permeable side gas discharge port 63 is connected through line 15 to intake air passageway 4 of the engine. Impermeable side gas discharge port 64 is connected through line 14 to lower opening 72 of the condenser, so that gas (the fuel vapor-rich component) from port 64 is joined with fuel vapor from line 16. As a result, gas containing fuel vapor is introduced into condenser 7. Thus, in this embodiment, fuel vapor generated in the fuel tank and the fuel vapor-rich component obtained under concentration in membrane separation module are joined with each other to be introduced into condenser 7. Additionally, a part of the fuel vapor-rich component which has not been liquefied is introduced into canister 2.

Although the fuel vapor treatment system of this embodiment is complicated in piping as compared with that of the first embodiment, the temperature of the condenser is lowered in progress of purging of fuel vapor so that a part of fuel vapor generated in the fuel tank can be liquefied and recovered since fuel vapor is introduced via the condenser into canister 2. In this connection, experiments were conducted under the same test conditions as those in the first embodiment to measure variation in amount of the adsorbed fuel vapor within canister 2 in terms of lapse of time, similarly to that in the first embodiment. Results of this measurement were indicated as a curve C2 in FIG. 9. The results in FIG. 9 reveal that fuel vapor generated in the fuel tank can be prevented from being introduced into canister 2 in progress of purging of fuel vapor, and therefore the fuel vapor treatment system of this embodiment is improved in purging rate of fuel vapor as compared with the first embodiment.

Figure 6:
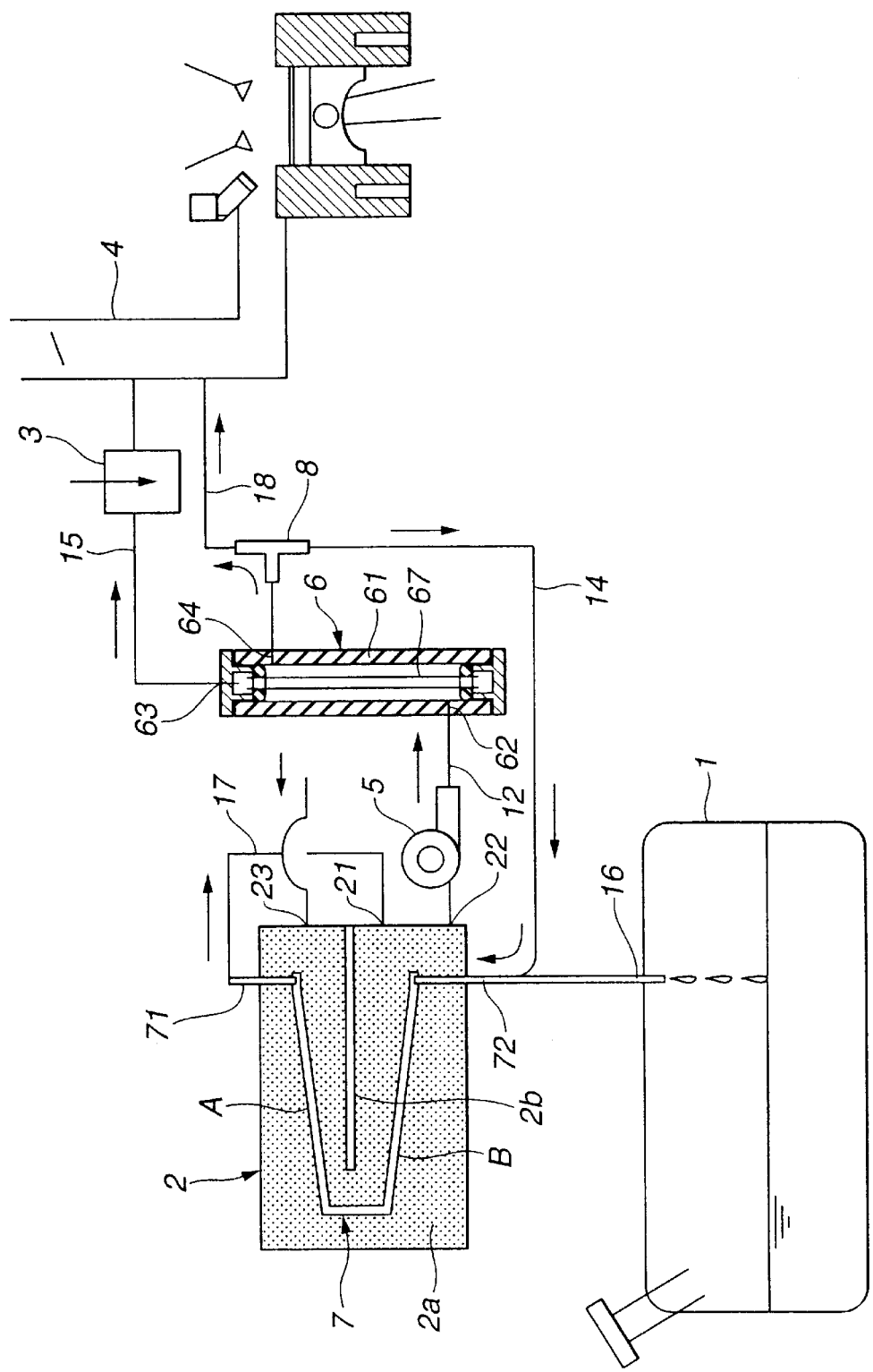
FIG. 6 is a schematic illustration, partly in section, of a third embodiment of the fuel vapor treatment system according to the present invention.

FIG. 6 illustrates a third embodiment of the fuel vapor treatment system according to the present invention, similar to the second embodiment of FIG. 5, with the exception that three-way or change-over valve 8 is provided to be connected to impermeable side gas discharge port 64 in order to change over the flow direction of the fuel vapor-rich component between the side of the engine and the side of condenser 7. More specifically, the three-way valve has an inlet port (no numeral) connected to impermeable side gas discharge port 64 of the membrane separation module, a first outlet port (no numeral) connected to bypass line 18, and a second outlet port (no numeral) connected to line 14. The bypass line is provided between three-way valve 8 and intake air passageway 4 of the engine. In this embodiment, fuel vapor treatment by combustion of fuel vapor in the engine is also used in combination with fuel vapor treatment by liquefaction, thereby making it possible to hasten purging of fuel vapor from the canister.

Assume that the vehicle is parked under the blazing sun in the summer season, in which a large amount of fuel vapor is generated in the fuel tank and adsorbed in the fuel vapor adsorbing material in the canister. With the fuel vapor treatment system of this embodiment, immediately after (for example, 5 minutes) the engine is started during parking of the vehicle under the blazing sun, three-way valve 8 is operated to direct the flow of the fuel vapor-rich component into bypass line 18 so that fuel vapor purged from the canister is flown into intake air passageway 4 to be burnt in the engine, thus controlling the rate of purging of fuel vapor from the canister.

It will be understood that fuel vapor can be directly fed into the engine without passing through the separation membrane, and therefore the flow rate of purged fuel vapor can be increased 3 to 5 times that in the second embodiment. Additionally, such rapid purging quickly lowers the temperature of condenser 7 housed in the canister. This temperature lowering makes it possible to liquefy the fuel vapor-rich component, in which three-way valve 8 is operated to direct the flow of the fuel vapor-rich component to lower opening 72 of the condenser so as to start liquefaction and recovery of fuel vapor. Accordingly, in case that a large amount of fuel vapor has been adsorbed in the canister, the temperature of the condenser is rapidly lowered by accomplishing combustion treatment of fuel vapor in the engine immediately after engine starting, upon which liquefaction and recovery of fuel vapor is started. This effectively achieves fuel vapor treatment in the vehicle.

Assume that the vehicle is in traffic snarl in the summer season or parked continuing engine running under the blazing sun in the summer season. At this time, since the temperature of the fuel tank increases, it is assumed that the amount of fuel vapor to be generated in the fuel tank increases over the amount of fuel vapor purged from the canister. In such a case, three-way valve 8 is operated to direct the flow of the fuel vapor-rich component to bypass line 18 so that fuel vapor purged from the canister is combusted in the engine. Additionally, by monitoring the temperature of condenser 7, it is possible to predict the balance between adsorption and desorption of fuel vapor in the canister, upon which the amount of desorbed fuel vapor is controlled to increase over the amount of adsorbed fuel vapor. However, with such an operation manner, the lean burn operation or the engine operation under stratified change combustion may be impossible since much fuel vapor is fed into the engine, and therefore it is preferable to add a control for changing or returning the above engine operation to usual engine operation under homogeneous charge combustion.

Similarly to in the first embodiment, experiments were conducted on the fuel vapor treatment system of the third embodiment under the same test conditions as those in the first embodiment except for addition of such an operation that three-way valve 8 was operated to direct the flow of the fuel vapor-rich component to bypass line 18 so as to allow the fuel vapor-rich component to flow at a flow rate of 15 liters per minutes for 5 minutes, and thereafter operated to direct the flow of the fuel vapor-rich component to line 14 to allow the fuel vapor-rich component to flow at a flow rate of 5 liters per minutes. In the experiments, variation in temperature at sections A and B (indicated in FIG. 6) of the condenser 7 was measured in terms of lapse of time, similarly to that in the first embodiment. Results of this measurement are shown in FIG. 8 in which a curve A1 indicates the temperature at the section A while a curve B1 indicates the temperature at the section B. Additionally, in the experiments, variation in amount of the adsorbed fuel vapor within canister 2 was measured in terms of lapse of time corresponding to that in FIG. 8. Results of this measurement were indicated as a curve C3 in FIG. 9. The results in FIGS. 8 and 9 depict that, in this embodiment, purging of fuel vapor smoothly progresses while improving the purging rate of fuel vapor from the canister as compared with the first and second embodiments.

As appreciated from the above, according to the present invention, fuel vapor generated in the fuel tank and the like can be effectively recovered at a low cost, by using endothermic phenomena occurred during purging of fuel vapor from the fuel vapor adsorbing material in the canister.

The entire contents of Japanese Patent Application P2000-172585 (filed Jun. 8, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel vapor treatment system comprising:
   a canister connected to a fuel tank and containing a fuel vapor adsorbing material which generates endothermic energy during desorption of fuel vapor;
   a membrane separation module connected to said canister and including a separation membrane for separating a mixture gas purged from said canister into an air-rich component and a fuel vapor-rich component; and
   a condenser connected to said membrane separation module to be supplied with the fuel vapor-rich component from said membrane separation module, said condenser being housed in said canister and adapted to cool and liquefy fuel vapor in the fuel vapor-rich component to obtain liquefied fuel by the endothermic energy generated in said canister, the liquefied fuel being recovered.

2. A fuel vapor treatment system as claimed in claim 1, wherein said condenser has a portion defining a lower opening connected to a discharge port of said membrane separation module through which discharge port the fuel vapor-rich component is discharged, the lower opening being connected to the fuel tank, and a portion defining an upper opening connected to said canister so that fuel vapor in the fuel vapor-rich component is adsorbed in the fuel vapor adsorbing material, fuel vapor from the fuel tank being introduced through said condenser to said canister.

3. A fuel vapor treatment system as claimed in claim 2, further comprising a pipe for connecting the lower opening of said condenser to the fuel tank, said pipe extending to a position above surface of liquid fuel in the fuel tank.

4. A fuel vapor treatment system as claimed in claim 2, further comprising a change-over valve connected to the discharge port of said membrane separation module, said change-over valve being adapted to selectively direct flow of the fuel vapor-rich component to one of an intake air passageway of an engine and said condenser.

5. A fuel vapor treatment system as claimed in claim 1, wherein the separation membrane of said membrane separation module has a characteristic that air is selectively permeable through the separation membrane and has a separation factor of not smaller than 4.

6. A fuel vapor treatment system as claimed in claim 1, wherein the separation membrane of said membrane separation module has a characteristic that fuel vapor is selectively permeable through the separation membrane and has a separation factor of not smaller than 4.

7. A fuel vapor treatment system as claimed in claim 1, wherein the separation membrane of said membrane separation module has a characteristic that air is selectively permeable through the separation membrane, wherein vacuum generated in an engine is applied to the separation membrane as a driving force for carrying out membrane separation.

8. A fuel vapor treatment system as claimed in claim 1, wherein said condenser has a main body which is located in the fuel vapor adsorbing material of said canister.

9. A fuel vapor treatment system as claimed in claim 1, wherein said condenser has a portion defining an upper opening connected to a discharge port of said membrane separation module through which discharge port the fuel vapor-rich component is discharged, and a portion defining a lower opening connected to the fuel tank, the liquefied fuel being recovered through the lower opening of said condenser.

10. A fuel vapor treatment system as claimed in claim 9, further comprising a pipe for connecting the lower opening of said condenser to the fuel tank, said pipe extending to a position below surface of liquid fuel in the fuel tank.

\* \* \* \* \*